(12) United States Patent
Carbonelli et al.

(10) Patent No.: US 8,488,690 B2
(45) Date of Patent: Jul. 16, 2013

(54) CHANNEL ESTIMATION

(75) Inventors: Cecilia Carbonelli, Munich (DE);
Stefan Fechtel, Zorneding (DE)

(73) Assignee: Intel Mobile Communications GmbH,
Neubiberg (DE)

( * ) Notice: Subject to any disclaimer, the term of this patent is extended or adjusted under 35 U.S.C. 154(b) by 1130 days.

(21) Appl. No.: 12/192,642

(22) Filed: Aug. 15, 2008

(65) Prior Publication Data

US 2010/0040154 A1    Feb. 18, 2010

(51) Int. Cl.
*H04L 27/28*    (2006.01)
(52) U.S. Cl.
USPC ........... 375/260; 375/267; 375/340; 375/350; 370/203; 370/208; 370/210
(58) Field of Classification Search
USPC ................. 375/260, 340, 343, 346; 370/203, 370/208, 210
See application file for complete search history.

(56) References Cited

U.S. PATENT DOCUMENTS

| | | | | |
|---|---|---|---|---|
| 2007/0076804 | A1* | 4/2007 | Sestok et al. | 375/260 |
| 2008/0049598 | A1* | 2/2008 | Ma et al. | 370/208 |
| 2008/0123758 | A1* | 5/2008 | Paik et al. | 375/260 |
| 2008/0317177 | A1* | 12/2008 | Hoejen-Soerensen | 375/346 |

OTHER PUBLICATIONS

Speth, M., et al.. "Optimum Receiver Design for Wireless Broadband Systems using OFDM.I", IEEE Transactions on Communications, vol. 47, Issue 11, Nov. 1999, pp. 1668-1677.
3GPP TS 36.211 V1.3.2 (Sep. 2007): 3rd Generation Partnership Project; Technical Specification Group Radio Access Networ; Evolved Universal Terrestrial Radio Access (E-UTRA); Physical Channels and Modulation.
Morelli, M., et al., "A comparison of Pilot-Aided Channel Estimation Methods for OFDM Systems", IEEE Transactions on Signal Processing, vol. 49, Issue 12, Dec. 2001, pp. 3065-3073.
Hoeher P., et al., "Pilot-Symbol-Aided Channel Estimation in Time and Frequency", 1997 In Proc. International Conference on Acoustics, Speech and Signal Proc. (ICASSP'97), vol. 3, pp. 1845-1848, Munich, Apr. 1997.
Auer, G., "Modeling of OFDM Channel Estimation Errors", 10th International OFDM Workshop, Hamburg, Germany, Aug. 31, 2005.
Zhu, X., et al., "Performance Analysis of Maximum Likelihood Detection in a MIMO Antenna System", IEEE Transactions on Communications, vol. 50, Issue 2, pp. 187-191, Feb. 2002.
Fechtel, Stefan, U.S. Appl. No. 11/659,361, "Advanced Pilot-Based OFDM Channel Estimation for Mobile DVB-T/H" pp. 1-51.

* cited by examiner

*Primary Examiner* — Daniel Washburn
*Assistant Examiner* — Eboni Hughes
(74) *Attorney, Agent, or Firm* — Eschweiler & Associates, LLC

(57) ABSTRACT

A method of channel estimation and a channel estimator for a multiple carrier radio transmission system is described. The method comprises receiving a signal comprising a symbol-carrier matrix, the symbol-carrier matrix comprising a predetermined pattern of pilot symbols, and determining first channel estimates at pilot symbol positions of the pilot symbols in the symbol-carrier matrix. The method further comprises determining second channel estimates at intermediate positions of the symbol-carrier matrix, wherein the intermediate positions are separated from the pilot symbol positions of the pilot symbols by positions associated with non-determined channel estimates and determining third channel estimates at further positions of the symbol-carrier matrix.

18 Claims, 10 Drawing Sheets

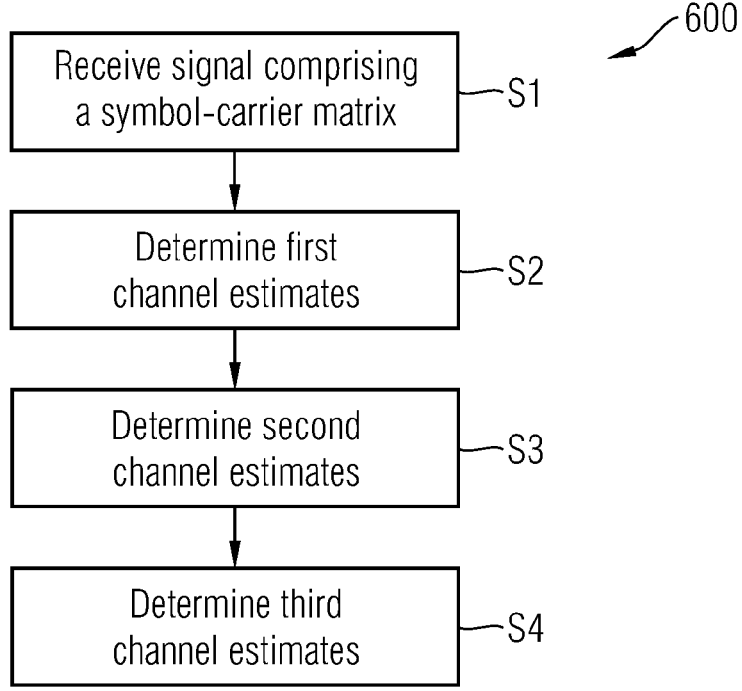
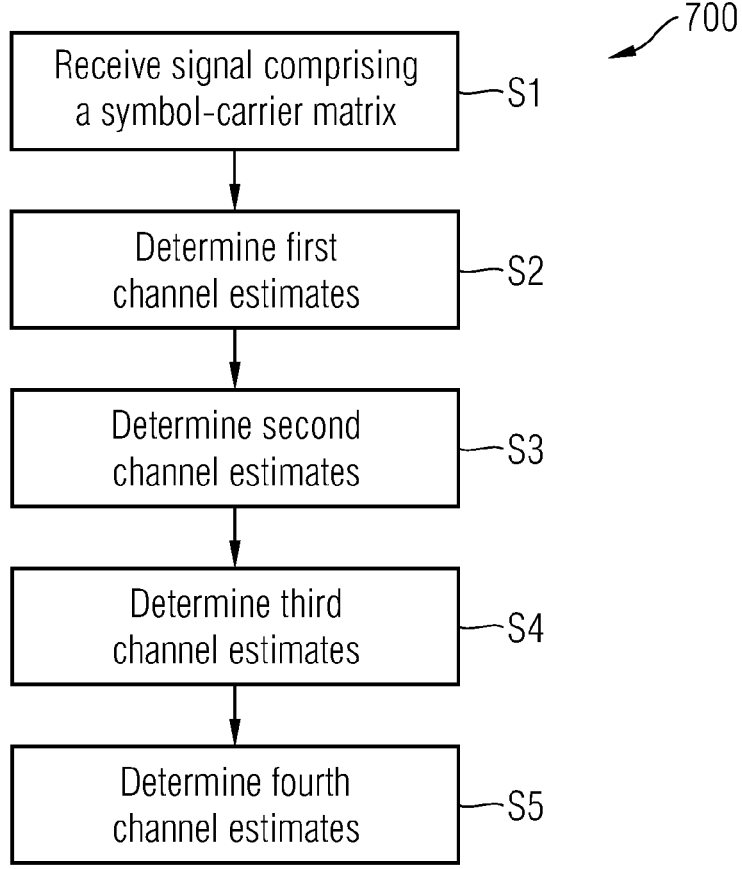

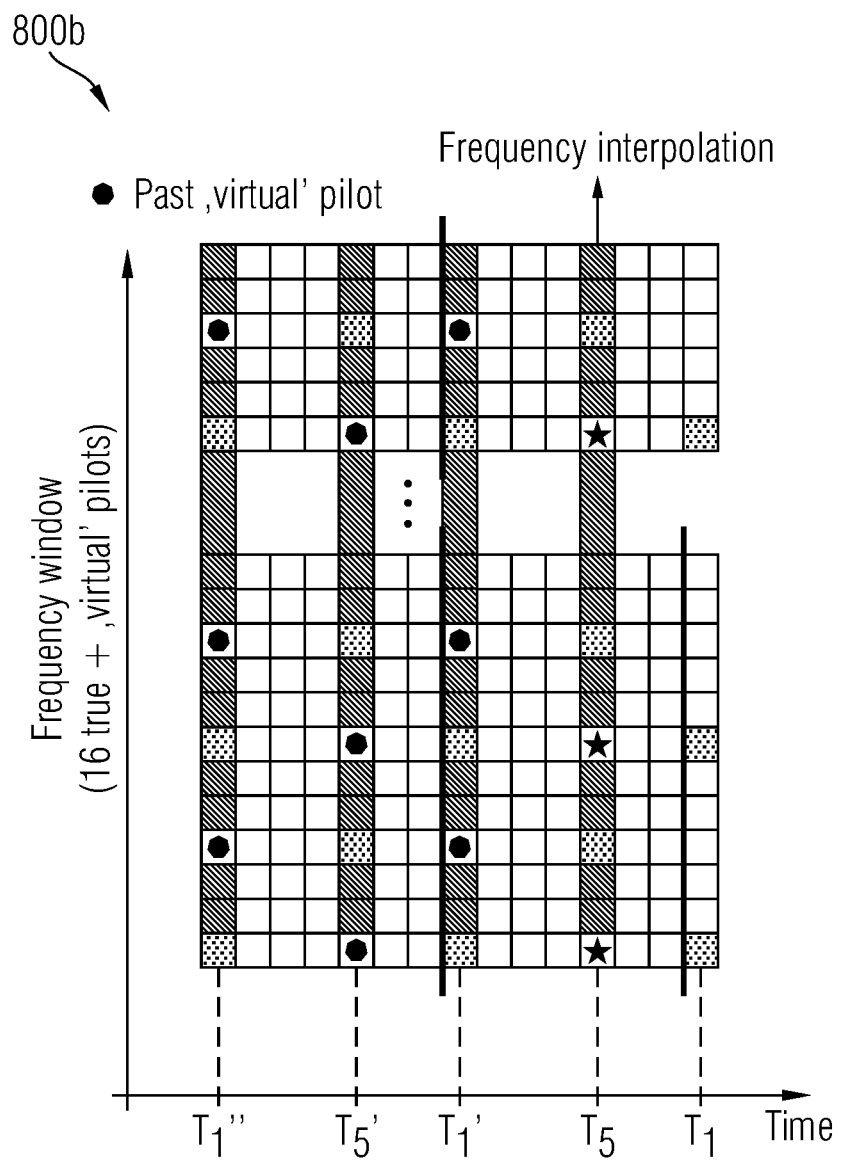

US 8,488,690 B2

CHANNEL ESTIMATION

FIELD OF INVENTION

This invention relates to a method of channel estimation and a channel estimator.

BACKGROUND OF THE INVENTION

Orthogonal Frequency Division Multiplexing (OFDM) multi-carrier modulation is one example of a multi-carrier modulation method. OFDM may be used in many communication systems and has become increasingly popular because it provides a substantial reduction in equalization complexity compared to classical modulation techniques. For demodulating OFDM-modulated data in the presence of substantial time variations of the transmission channel, knowledge of the transmission channel frequency response is required. Such knowledge may be obtained by channel estimation.

BRIEF DESCRIPTION OF THE DRAWINGS

The following description and annexed drawings set forth in detail certain illustrative aspects and implementations. These are indicative of only a few of the various ways in which the principles of the invention may be employed.

FIG. 6 schematically illustrates a method 600.

FIG. 7 schematically illustrates a further method 700.

FIG. 8b schematically illustrates a second step of a 3×1D channel estimation method.

DETAILED DESCRIPTION OF THE INVENTION

Figure 1:
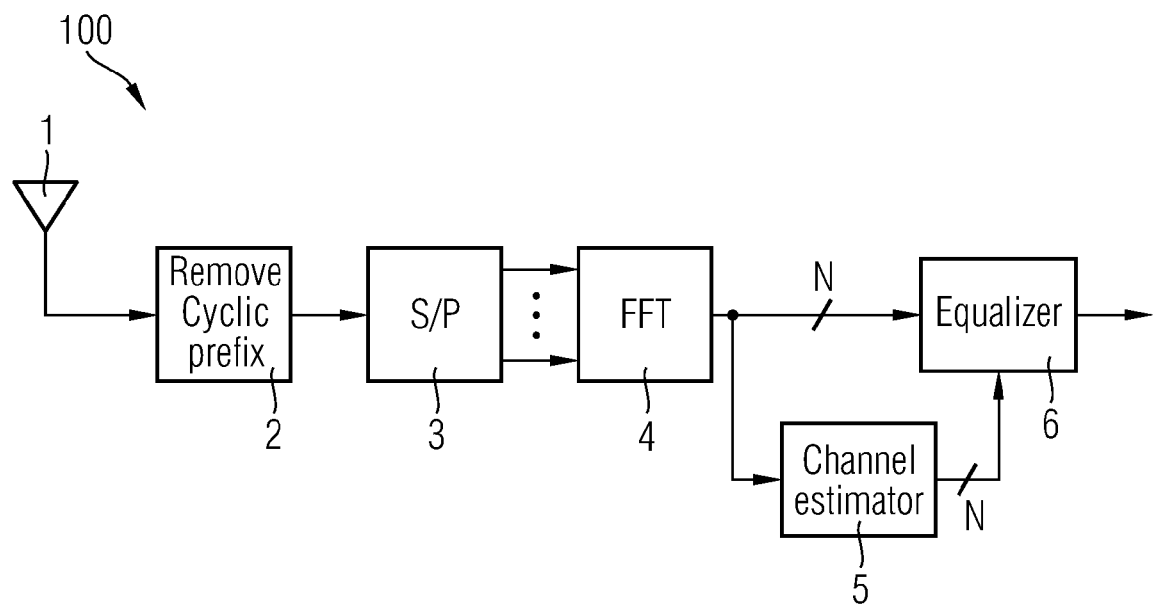
FIG. 1 schematically illustrates a receiver 100.

In the following, one or more aspects and embodiments of the invention are described with reference to the drawings, wherein like reference numerals are generally utilized to refer to like elements throughout. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the invention. The following description is not to be taken in a limiting sense, and the scope of the invention is defined by the appended claims.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal.

In the following, the expression OFDM is not intended to be limited to specific standards or applications but includes virtually all multi-carrier modulation systems. In particular, radio systems employing multiple transmit and/or receive antennas known as multiple input/multiple output (MIMO) systems can be used with OFDM (e.g., multi-carrier modulation) and may also use the techniques described herein.

The following description may be read in connection with terrestrial/hand-held digital video broadcasting (DVB-T/H) which is based on terrestrial transmitters and a communication system design adapted for mobile receivers. However, also other communications systems, for example, satellite OFDM systems, may benefit from the concepts and principles outlined herein.

In addition, the following description may be read in connection with arbitrary mobile communications standards employing multi-carrier modulation, such as for example, the Universal Mobile Telecommunications System (UMTS) Standard or the Long Term Evolution (LTE) Standard. Moreover, the concepts presented herein are applicable to radio systems employing an arbitrary number of transmit and/or receive antennas, that is Single Input Single Output (SISO) systems, Single Input Multiple Output (SIMO) systems, Multiple Input Single Output (MISO) systems and MIMO systems.

FIG. 1 schematically illustrates one embodiment of a receiver 100 such as may employ OFDM multi-carrier modulation. The receiver 100 includes an antenna 1, a unit 2 to remove cyclic prefixes of OFDM symbols, a serial-to-parallel (S/P) converter 3 and a Fast Fourier Transformation (FFT) unit 4 connected in series. The FFT unit 4 is connected to a channel estimator 5 and an equalizer 6. FIG. 1 is of qualitative character and it is understood that the receiver 100 may comprise further components. Usually the antenna 1 receives analog signals in a radio frequency range which are first down-converted into an intermediate frequency (IF) band or into the baseband by a down-conversion unit (not shown). After down-conversion, the analog signal is typically converted to a digital signal by means of an Analog-to-Digital Converter (ADC) (not shown) to provide digital samples. The receiver 100 may further contain decoders, amplifiers, analog filters, digital filters, etc.

During operation of the receiver 100, the antenna 1 receives OFDM carrier signals sent by a transmitter (not shown). Of course, the illustrated receiver 100 may be generalized to an arbitrary number of reception antennas that may be configured to receive data streams transmitted by an arbitrary number of transmission antennas. The OFDM carrier signal corresponds to a sum of orthogonal subcarriers, with the data on each of the subcarriers being independently modulated. For example, modulation techniques like Quadrature Amplitude Modulation (QAM) or Phase Shift Keying (PSK) may be employed.

The analog signal is converted to the digital domain and forwarded to the unit 2 which removes cyclic prefixes of the OFDM symbols. The serial-to-parallel converter 3 converts the serial signal into N parallel signals which are forwarded to the FFT unit 4. Note that, for the sake of simplicity, FIG. 1 does not explicitly illustrate all N signal paths. The FFT unit 4 performs a forward FFT and coverts the N signals to the frequency domain.

In a next step, the N signals are forwarded to the channel estimator 5 and the equalizer 6, respectively. The channel estimator 5 performs a channel estimation which is particularly based on pilot signals. The channel coefficients resulting from this channel estimation may then be used by the equalizer 6 to properly equalize the N signals received from the FFT unit 4. After equalization, the N signals are forwarded and may be processed by further components (not shown) of the receiver 100. For example, the equalizer 6 may forward the N signals to a detector for symbol detection of a digital signal processor.

During operation of the receiver 100 and a corresponding transmitter (not shown), the consecutive OFDM symbols are transmitted over a generally time-variant, frequency-selective and noisy channel. Considering an OFDM system having N subcarriers and L OFDM symbols per time slot, the end-to-end OFDM modem transmission model for information data symbols $x_{n,1}$ may be written as $$y_{n,l} = x_{n,l} \cdot H_{n,l} + z_{n,l} \quad (1)$$

In equation (1), the frequency index n refers to the respective subcarrier and runs from 1 to N. The time index 1 runs from 1 to L. The symbol $y_{n,l}$ denotes the complex baseband representation of a received signal for a subcarrier n and an OFDM symbol l. In a similar way, the symbol $x_{n,l}$ denotes a transmitted symbol of energy $E_s$, the symbol $H_{n,l}$ denotes a channel transfer function sample and the symbol $z_{n,l}$ denotes an additive white Gaussian noise with zero mean and a variance $N_0$ plus additional interference (e.g., inter-carrier interference due to fast fading channels).

In order to properly demap the data symbols $x_{n,l}$, the receiver 100 (with respect to its channel estimator 5) needs to generate channel estimates $\hat{H}_{n,l}$. In many OFDM systems including DVBT/H and LTE, known symbols, termed pilot symbols or pilots, may be periodically inserted in the transmitted data signals in order to facilitate channel estimation. Since the data transmission depends on two dimensions (see, e.g., frequency index n and time index l in equation (1)), the pilots may be represented in a two dimensional time-frequency grid. Herein, this time-frequency grid may be referred to as symbol-carrier matrix or pilot grid.

Figure 2:
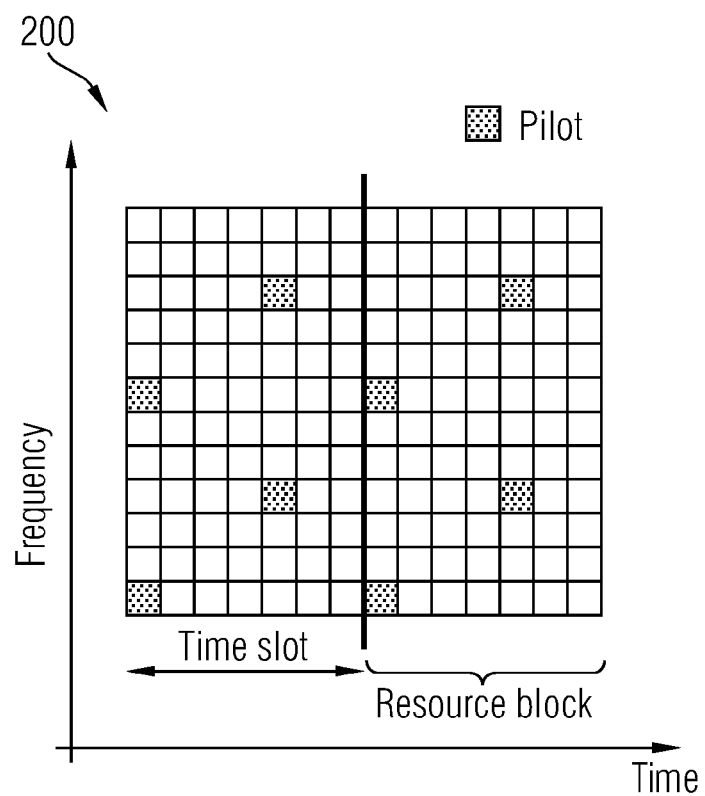
FIG. 2 schematically illustrates a symbol-carrier matrix 200.

FIG. 2 schematically illustrates a symbol-carrier matrix 200 for a SISO configuration. The frequency (subcarrier) index n is plotted against the time (OFDM symbol) index l, wherein each coordinate square may be interpreted as an OFDM symbol transmitted at time 1 and at a frequency of the subcarrier with index n. FIG. 2 indicates an LTE resource block in the downlink direction having a normal cyclic prefix. Such a resource block is defined as a box including twelve consecutive subcarriers and seven consecutive OFDM symbols.

In FIG. 2, transmitted pilots are indicated by filled coordinates squares that may form an irregular two-dimensional pilot pattern. Channel estimates of these pilots may be obtained by applying a Least Square (LS) demodulation which for the case of PSK reduces to $$\hat{H}_{n,l} = y_{n,l} \cdot x^*_{n,l} \quad (2)$$

Here, the star denotes complex conjugation and the indices n and l refer to the positions of the pilots indicated by the filled coordinate squares. The channel coefficients for the remaining values of n and l may be calculated by techniques which will be explained hereinafter.

Figure 3:
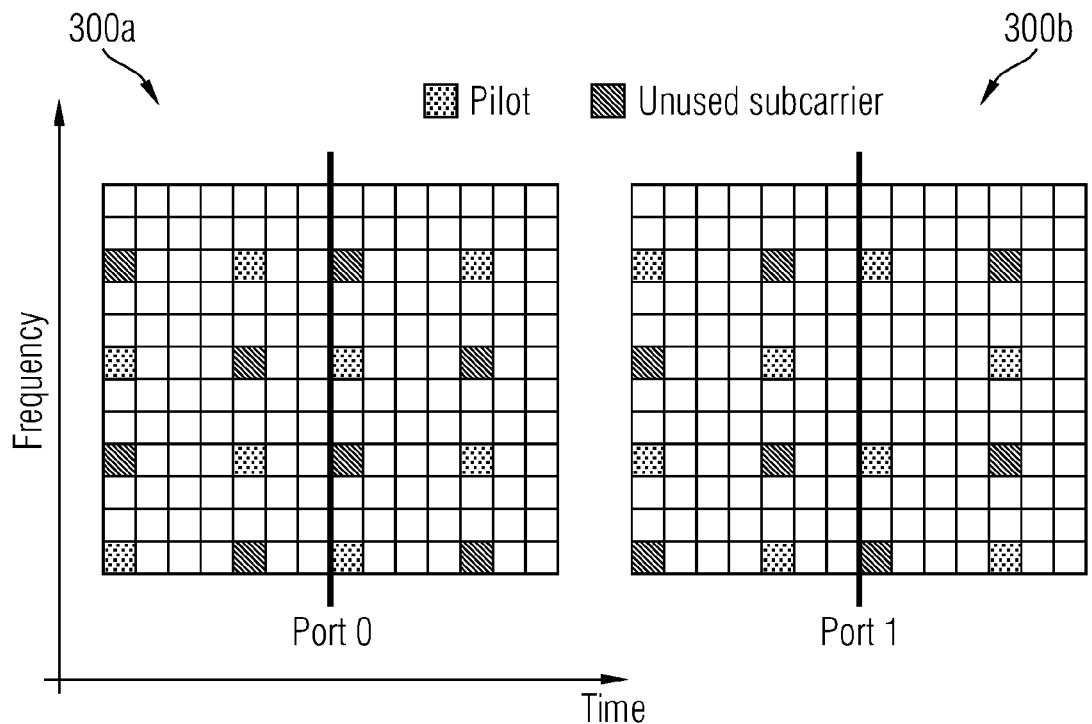
FIG. 3 schematically illustrates further symbol-carrier matrices 300a and 300b.

FIG. 3 schematically illustrates further symbol-carrier matrices 300a and 300b for a MIMO configuration. In particular, FIG. 3 relates to a "two times two" antenna configuration. Each of the symbol-carrier matrices 300a and 300b corresponds to an antenna port (e.g., Port 0 and Port 1). The symbol-carrier matrices 300a and 300b include transmitted pilots indicated by filled coordinates square, as well as unused subcarriers indicated by hatched coordinates square.

By comparing the symbol-carrier matrices 300a and 300b, it becomes apparent that the transmitted pilots of the symbol-carrier matrix 300a correspond to the unused pilots of the symbol-carrier matrix 300b and vice versa. For the case of the first antenna port 0 transmitting symbols, the second antenna port 1 does not transmit symbols and remains silent. This implies that pilots transmitted via the two antenna ports 0 and 1 are orthogonal to each other. Accordingly, a channel estimation for a MIMO configuration may be regarded as a straightforward extension of a channel estimation for a SISO configuration.

Referring back to FIG. 2, the channel estimates $\hat{H}_{n,l}$ for the remaining values, i.e. the non-filled coordinate squares, may be derived by interpolation techniques. A first possibility may be referred to as two-dimensional or 2D (Wiener) interpolation performed by a 2D estimator. Such a 2D Wiener interpolation or channel estimation involves a two-dimensional linear Finite Impulse Response (FIR) interpolation filter that uses all pilots received (see, e.g., filled coordinate squares) inside a finite two-dimensional region of the symbol-carrier matrix.

Figure 4:
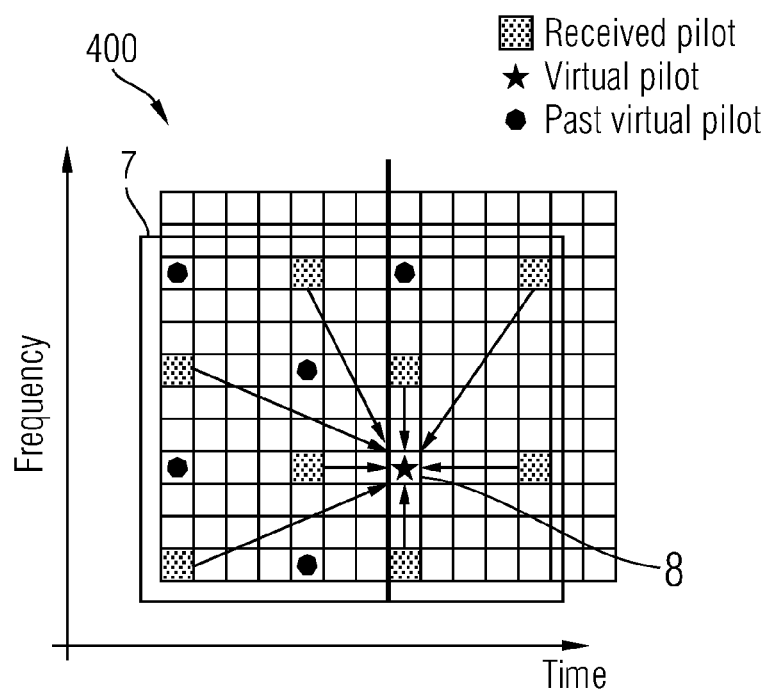
FIG. 4 schematically illustrates a 2D channel estimation method.

FIG. 4 schematically illustrates one embodiment of a 2D channel estimation or interpolation method. A symbol-carrier matrix (or pilot grid) 400 includes received pilots indicated by filled coordinates squares. By using all received pilots located inside a rectangle 7, a 2D Wiener interpolation is performed and a pilot at a position 8 (indicated by a star) is estimated. The estimated pilot may be referred to as a virtual pilot. Note that FIG. 4 shows further (past) virtual pilots indicated by filled circles. These virtual pilots have been estimated during previous method steps. By applying the described interpolation multiple times, channel samples may be estimated at all positions of the symbol-carrier matrix 400.

Often, 2D channel estimation can be separated into 2×1D (two stage, one-dimensional) channel estimation, which is significantly less complex to implement with respect to optimum 2D channel estimation. 2×1D channel estimation is performed in a time direction and frequency direction, respectively, and may be implemented by a cascade of two linear FIR interpolation filters. When time interpolation precedes frequency interpolation, this case will be denoted herein by T-F. For the T-F case, an interpolator performs an interpolation in time direction at a fixed subcarrier frequency and a frequency interpolator performs an interpolation in the frequency direction at a fixed time. Alternately, when frequency interpolation precedes time interpolation, this case will be denoted herein by F-T.

Figure 5:
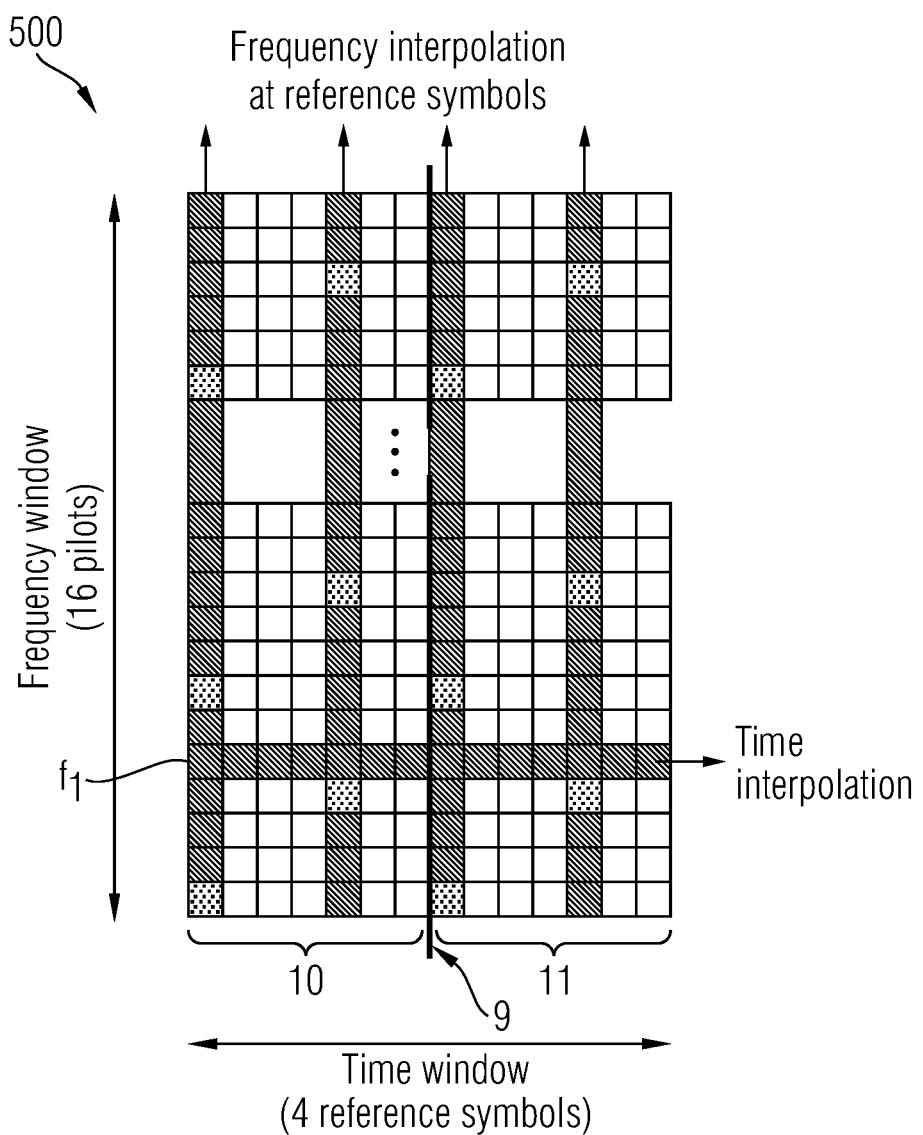
FIG. 5 schematically illustrates a 2×1D channel estimation method.

FIG. 5 schematically illustrates a 2×1D channel estimation method. A symbol-carrier matrix 500 with a frequency window of sixteen pilots is shown. A vertical line 9 separates a first time slot 10 on the left of matrix 500 from a second time slot 11 on the right of matrix 500. Each time slot includes seven symbols for each subcarrier frequency with a symbol duration of $T_S$.

In a first method step, an interpolation in the frequency direction is performed at times 0 and $4 \cdot T_S$ for both time slots. After this interpolation, all channel sample estimates at the times 0 and $4T_S$ have been estimated with each of the estimated channel samples being indicated by a hatched coordinate square. In a second method step, an interpolation in the time direction is performed at a frequency $f_1$. Again, the estimated channel samples are indicated by hatched coordinate squares. Of course, the time interpolation at frequency $f_1$ may be followed by interpolations at further frequencies.

Methods 400 and 500, of FIGS. 4 and 5, respectively, illustrate multiple embodiments of channel estimating a symbol-carrier matrix, such as those previously described. A 1-stage approach, for example, includes one stage or method step, for example a 2D estimation, an interpolation in the time direction or an interpolation in the frequency direction. A 2-stage approach includes two stages, such as an interpolation in the time direction followed by an interpolation in the frequency direction or vice versa. Possible approaches are summarized in Table 1 with the first three rows indicating examples of 1-stage approaches and the following two rows indicating examples of 2-stage approaches.

TABLE 1

| Stage 1 | Stage 2 |
|---------|---------|
| 2D      | —       |
| T       | —       |
| F       | —       |
| T       | F       |
| F       | T       |

It is to be noted that the choice between T-F and F-T depends on signal parameters (subcarrier spacing and symbol time) of the symbol-carrier matrix, as well as on the maximum allowed Doppler bandwidth and the delay spread. For example, in one embodiment of an LTE OFDM system, the requirements on the channel delay spread may be more significant than the requirements on the Doppler bandwidth.

In the following Table 2, DT denotes the spacing in time between the pilots available for time interpolation, while DF denotes the spacing in frequency between the pilots available for frequency interpolation. Moreover, $Td_{lim}$ denotes the limiting value for the time delay spread and $Bd_{lim}$ denotes the limiting value for the Doppler bandwidth obtained according to the Nyquist theorem in time and frequency. The values are stated for the F-T and T-F cases in an LTE system. The values are based on a symbol-carrier matrix similar to FIG. 2 and a typical LTE parameter setting with symbol duration $T_S$ of 71.4 μs and a subcarrier spacing Δf of 15 kHz. For the channel being interpolated first in time, the resulting pilot spacing in the frequency direction is halved and higher delay spreads are acceptable.

TABLE 2

| LTE | T-F | F-T |
|-----|-----|-----|
| $Bd_{lim} = 1/(2 \cdot DT)$ | $1/(2 \cdot 6 \cdot T_S) = 1167$ Hz | $1/(2 \cdot 4 \cdot T_S) = 1745$ Hz |
| $Td_{lim} = 1/(DF)$ | $1/(3 \cdot \Delta f) = 22.2$ ms | $1/(6 \cdot \Delta f) = 11.1$ ms |

The following Table 3 corresponds to Table 1, but refers to a DVB-T/H 8K system. The values are based on a symbol duration $T_S$ of 1.12 ms and a subcarrier spacing Δf of 1.116 kHz.

TABLE 3

| DVB-T/H | T-F | F-T |
|---------|-----|-----|
| $Bd_{lim} = 1/(2 \cdot DT)$ | $1/(2 \cdot 4 \cdot T_S) = 112$ Hz | $1/(2 \cdot T_S) = 446$ Hz |
| $Td_{lim} = 1/(DF)$ | $1/(3 \cdot \Delta f) = 298$ μs | $1/(12 \cdot \Delta f) = 74$ μs |

It is to be noted that the 2D and 2×1D methods described above rely on minimal a priori channel knowledge. Typically, uniform Doppler and delay power spectra may be assumed, wherein the limit $f_{max}$ for the frequency and the limit $\tau_{max}$ for the delay time are typically fixed to the maximum Doppler bandwidth $B_D$ and to the cyclic prefix length $T_{CP}$, respectively. Here, $B_D = 2 \cdot f_D$, wherein $f_D$ denotes the maximum channel Doppler frequency. The interpolation coefficients may be computed offline such that in one embodiment, multiplications by real-valued coefficients and summation operations in real time are employed. For the minimum number $n_{min}$ of interpolating coefficients: $n_{min} \ll N$, wherein N denotes the size of the FFT.

In 2D channel estimation as well as for the 2×1D case, the FIR filter (Wiener) coefficients are typically optimized in a Minimum Mean Square Error (MMSE) sense. It is known that a 2D Wiener filter or two 1D Wiener filter provide for optimum MMSE performance. For the 2×1D method, the Wiener (MMSE) coefficients $w_f$ for the frequency direction and the time direction may be obtained via elements of cross-correlation vectors and auto-correlation matrices.

For the frequency direction, elements $r_f$ of the cross-correlation vector may be written as $$[r_f(n)]_i = si(2\pi\tau_{max}\Delta F(n-i)), \qquad (3)$$

wherein si denotes the sinc function.

In equation (3), the index i indicates a frequency taken from the set F of frequencies associated with the pilots used for interpolation. The set F includes $N_f$ frequencies and thus the index i runs from 1 to $N_f$. The parameter ΔF denotes the subcarrier spacing, while the parameter $\tau_{max}$ denotes the limit for the delay time as mentioned above. The parameter n accounts for the fact that 1D Wiener filtering amounts to a sliding window operation along the frequency axis.

For the time direction, elements $r_t$ of the cross-correlation vector may be written as $$[r_t(l)]_i = si(2\pi f_{max} T_S(l-i)). \qquad (4)$$

Here, the parameter $T_S$ denotes the symbol duration, while the parameter $f_{max}$ denotes the limit for the frequency as mentioned above. In equation (4), the index i indicates a time taken from the set T of times associated with the OFDM symbols used for interpolation. The set T includes $N_t$ times and thus the index i runs from 1 to $N_t$. The parameter l accounts for the fact that 1D Wiener filtering amounts to a sliding window operation along the time axis.

For the frequency direction, an element $R_f$ of the auto-correlation matrix may be written as $$[R_f]_{i,j} = si(2\pi\tau_{max}\Delta F(i-j)) + \frac{N_0}{E_S}\delta(i-j). \quad (5)$$

The parameter $N_0$ denotes the variance of the additive white Gaussian noise. The indices i and j run from 1 to $N_f$, respectively.

For the time direction, an element $R_t$ of the auto-correlation matrix may be written as $$[R_t]_{i,j} = si(2\pi f_{max}T_S(i-j)) + \frac{N_0}{E_S}\delta(i-j). \quad (6)$$

The indices i and j run from 1 to $N_t$, respectively.

It is to be noted that uniform and symmetric Doppler and delay power spectra have been assumed for equations (3) to (6).

Employing equations (3) and (5), Wiener (MMSE) coefficients for an interpolation in the frequency direction for the set of times at which interpolation is performed may be written as $$w_f(n)^T = [w_{f,1}(n), \ldots, w_{f,N_f}(n)] = r_f(n)^T R_f^{-1}, \quad (7)$$

wherein the superindex T denotes the transpose of the vector.

In a similar way, but now employing equations (4) and (6), Wiener (MMSE) coefficients for an interpolation in the time direction for the set of time indices at which interpolation is performed may be written as $$w_t(l)^T = [w_{t,1}(l), \ldots, w_{t,N_t}(l)] = r_t(l)^T R_t^{-1}. \quad (8)$$

Note that Wiener coefficients for the 2D case may be computed similar to equations (7) and (8). Depending on the structure and the size of the underlying symbol-carrier matrix, the 2×1D approach may be less complex than the 2D approach. The performance of a 2×1D filter may not always be completely satisfactory due to channel estimation noise and large interpolation errors whose detrimental effects on the Bit Error Rate (BER) performance is even more evident in a MIMO configuration. The BER floor is caused by an irreducible estimation error, i.e. an error which does not decrease as the Signal-to-Noise Ratio (SNR) increases. Moreover, the BER floor starts at lower SNR values as the number of transmitting antennas increases.

FIG. 6 schematically illustrates a method 600 of channel estimation for a multiple carrier radio transmission system, such as for example, an OFDM system. The method 600 includes four method steps S1 to S4. In a first method step S1, a signal is received that includes a symbol-carrier matrix having a pre-determined pattern of pilot symbols. For a SISO and a MIMO configuration, the symbol-carrier matrix of the received signal, for example, may correspond to the symbol-carrier matrices shown in FIGS. 2 and 3, respectively.

In a second method step S2, first channel estimates at the positions of the pilot symbols (pilot symbol positions) in the symbol-carrier matrix are determined. Referring back to FIG. 2, the positions of the pilot symbols correspond to the filled coordinates squares. For example, the channel estimates at these positions may be obtained by applying a Least Square (LS) demodulation.

In a third method step S3, channel estimates at intermediate positions of the symbol-carrier matrix are determined. The intermediate positions are separated from the pilot symbol positions of the pilot symbols by positions associated with non-determined channel estimates. Referring back to FIG. 2, the intermediate positions correspond to white coordinate squares that do not touch the filled coordinate squares. Further referring to FIG. 4, an example for such an intermediate position is given by the virtual pilot indicated by a star. For example, the channel estimates at the intermediate positions may be determined by employing a 2D Wiener interpolation as illustrated by FIG. 4.

In a fourth method step S4, third channel estimates at further positions of the symbol carrier matrix are determined. For example, the fourth method step S4 may correspond to an interpolation in the time direction or an interpolation in the frequency direction as described in preceding paragraphs. Alternatively, the fourth method step S4 may correspond to a 2×1D channel estimation method as illustrated by FIG. 5, such as an F-T interpolation or a T-F interpolation.

One specific example for the method 600 may be a 2D Wiener interpolation followed by a 2×1D estimation. The symbol-carrier matrix at the start of the method may correspond to the symbol-carrier matrix 200 of FIG. 2 with the pilots at the filled coordinate squares being determined in the second method step S2.

The symbol-carrier matrix may lack regularity which may pose difficulties for channel estimating further pilots of the symbol-carrier matrix. For example, simplifications resulting from the symbol-carrier matrix regularity cannot be exploited during the process of channel estimation. It is thus desirable to make the symbol-carrier matrix more uniformly ordered and/or denser by punctually adding virtual pilots. These virtual pilots are favorably determined at an intermediate position as described above (see, e.g., third method step S3). For example, the determination of the virtual pilots may be performed by applying a 2D Wiener interpolation.

As a result of adding virtual pilots at intermediate positions, the symbol-carrier matrix or pilot grid has become more uniformly ordered. In a next step (e.g., fourth method step S4), an interpolation in the time (T) and in the frequency (F) direction is performed. Since the matrix has become more uniformly ordered due to the foregoing 2D interpolation, the T and F interpolation is now advantageously performed with a reduced spacing between the already estimated pilots.

The described method/approach may be referred to as 2D-T-F approach. Alternatively, a 2D-F-T approach may be performed. These approaches may be referred to as 3-stage approaches. In contrast to the 1-stage and 2-stage approaches summarized in Table 1, the 3-stage approaches benefit from their additional method step of making the symbol-carrier matrix more uniformly ordered and/or denser. For example, FIGS. 9 and 10 will show that this additional method step results in an improved BER performance of the performed channel estimation.

FIG. 7 schematically illustrates a further method 700 of channel estimation for a multiple carrier radio transmission system, for example, an OFDM system. The method 700 includes five method steps S1 to S5. In a first method step S1, a signal is received that includes a symbol-carrier matrix having a pre-determined pattern of pilot symbols. For a SISO and a MIMO configuration, the symbol-carrier matrix of the received signal may correspond to the symbol-carrier matrices shown in FIGS. 2 and 3, respectively.

In a second method step S2, first channel estimates at the positions of the pilot symbols in the symbol-carrier matrix are determined. Referring back to FIG. 2, the positions of the pilot symbols correspond to the filled coordinates squares. For example, the channel estimates at these positions may be obtained by applying a Least Square (LS) demodulation.

In a third method step S3, second channel estimates at further positions of the matrix are determined. The further positions have coordinates corresponding to one of symbol or carrier coordinates of the first channel estimates. That is, the further positions are located in the same row or the same column of the symbol-carrier matrix as the subcarrier coordinates of the first channel estimates. Method step S3 may thus correspond to a 2D interpolation as shown in FIG. 4 or alternatively to an interpolation in the time or in the frequency direction. Note that the virtual pilot indicated by a star in FIG. 4 shows coordinates that correspond to the symbol and carrier coordinates of pilots surrounding the virtual pilot.

In a fourth method step S4, third channel estimates at further positions of the matrix are determined. Similar to the third method step S3, the coordinates correspond to one symbol or carrier coordinates of the second channel estimates. In a fifth method step S5, fourth channel estimates at further positions of the matrix are determined. The coordinates correspond to one of symbol or carrier coordinates of the third channel estimates.

One specific example for the method 700 may be a T interpolation followed by an F interpolation followed by a T interpolation, such as a 3-stage T-F-T approach. Such an approach may be referred to as a 3×1D estimation and may be performed by a 3-stage estimator. A 3×1D T-F-T approach will be explained in connection with FIGS. 8a to 8c.

Figure 8A:
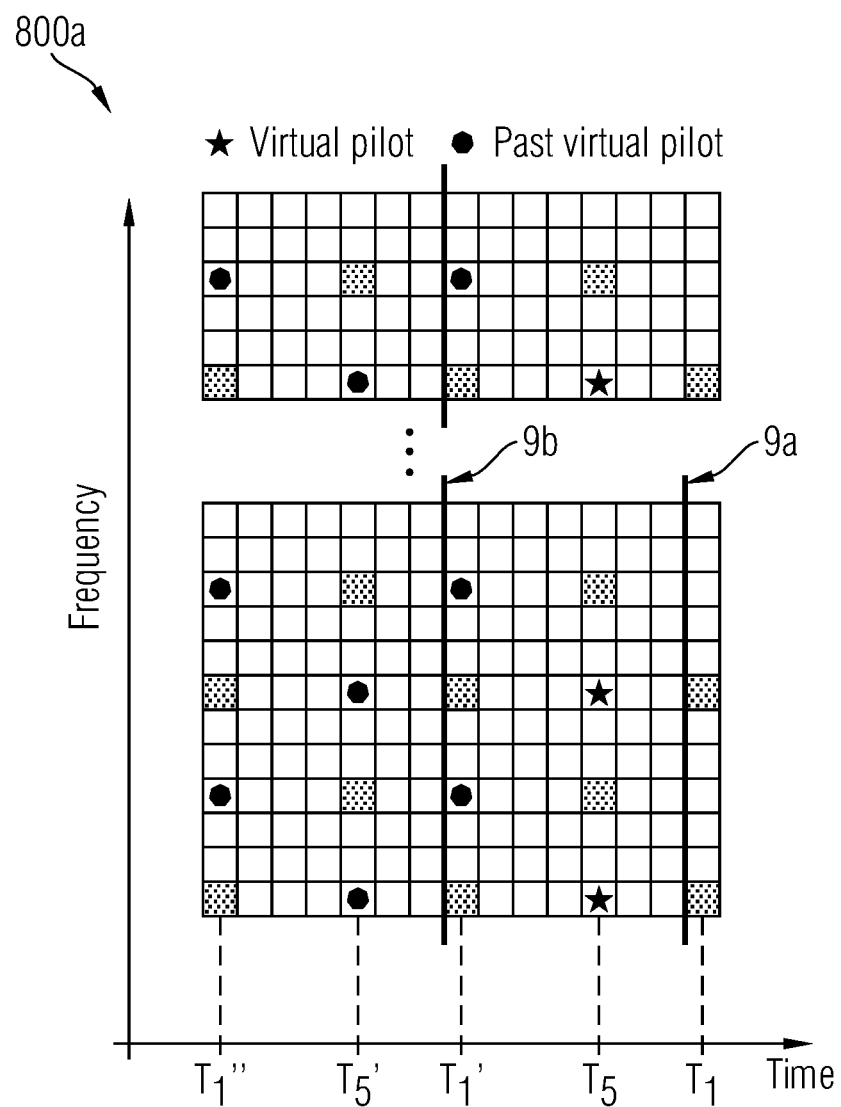
FIG. 8a schematically illustrates a first step of a 3×1D channel estimation method.

FIG. 8a schematically illustrates a time interpolation as a first stage of a 3×1D T-F-T channel estimation method. The first stage corresponds to the third method step S3 of method 700. A symbol carrier matrix 800a includes time slots separated by bold lines 9a and 9b. The symbol carrier matrix 800a further includes a pre-determined pattern of pilot symbols indicated by filled coordinate squares, as well as past virtual pilots indicated by filled circles. The virtual pilots indicated by filled circles have been estimated in previous method steps.

The first symbols of the illustrated time slots are located at times $T_1$, $T_1'$ and $T_1''$, respectively and may be expressed as $$T_1 = 7 \cdot n \cdot T_S + 0. \quad (9)$$

Here, n and $T_S$ denote an integer and the symbol duration, respectively.

At the time $T_1$, the channel coefficients for virtual pilots in the fifth reference symbol of the previous slot are estimated for multiple subcarrier frequencies. These estimated virtual pilots are located at a time $T_5$ and are indicated by a star. In a similar way, virtual pilots indicated by circles and located at the times $T_1'$ and $T_1''$ have been estimated in previous but similar method steps. For example, at the time $T_1'$, the virtual pilots of the fifth reference symbol of the previous slot, such as the virtual pilots located at the time $T_5'$ have been estimated.

The time $T_5$ indicates the fifth symbol in a time slot and may be expressed as $$T_5 = 7 \cdot n \cdot T_S + 4 \cdot T_S. \quad (10)$$

At the time $T_5$, a time interpolation is performed and the channel estimates for the virtual pilots in the first reference symbol of the current slot are estimated. For example, at the time $T_5'$, the virtual pilots indicated by circles located at the time $T_1''$ have been estimated. In a similar way, the virtual pilots indicated by circles and located at the reference symbol of time $T_1'$ have been estimated at the time $T_5$.

Note that the method step of FIG. 8a leads to a more uniformly ordered and denser symbol-carrier matrix of true pilots (see, e.g., filled coordinate squares) and virtual pilots (see, e.g., circles and stars).

FIG. 8b schematically illustrates a frequency interpolation as a second stage of a 3×1D T-F-T channel estimation method. The second stage corresponds to the fourth method step S4 of method 700. The symbol-carrier matrix 800b corresponds to the symbol-carrier matrix 800a at a later time. The frequency window includes sixteen true and/or virtual pilots. At time $T_1$, a frequency interpolation is performed and the channel estimates for the fifth symbol of the previous slot are estimated for all sub-carrier frequencies. The channel samples estimated during the method step of FIG. 8b are indicated by hatched coordinate squares located at time $T_5$.

In a similar way, at the time $T_5$, a frequency interpolation is performed and the channel estimates for first symbols in the current time slot are determined. For example, at the time $T_5$, a frequency interpolation is performed at the reference symbol of time $T_1'$. The frequency interpolations performed at the reference symbols of times $T_1'$, $T_1''$ and $T_5'$ are also indicated by (differently) hatched coordinate squares.

Figure 8C:
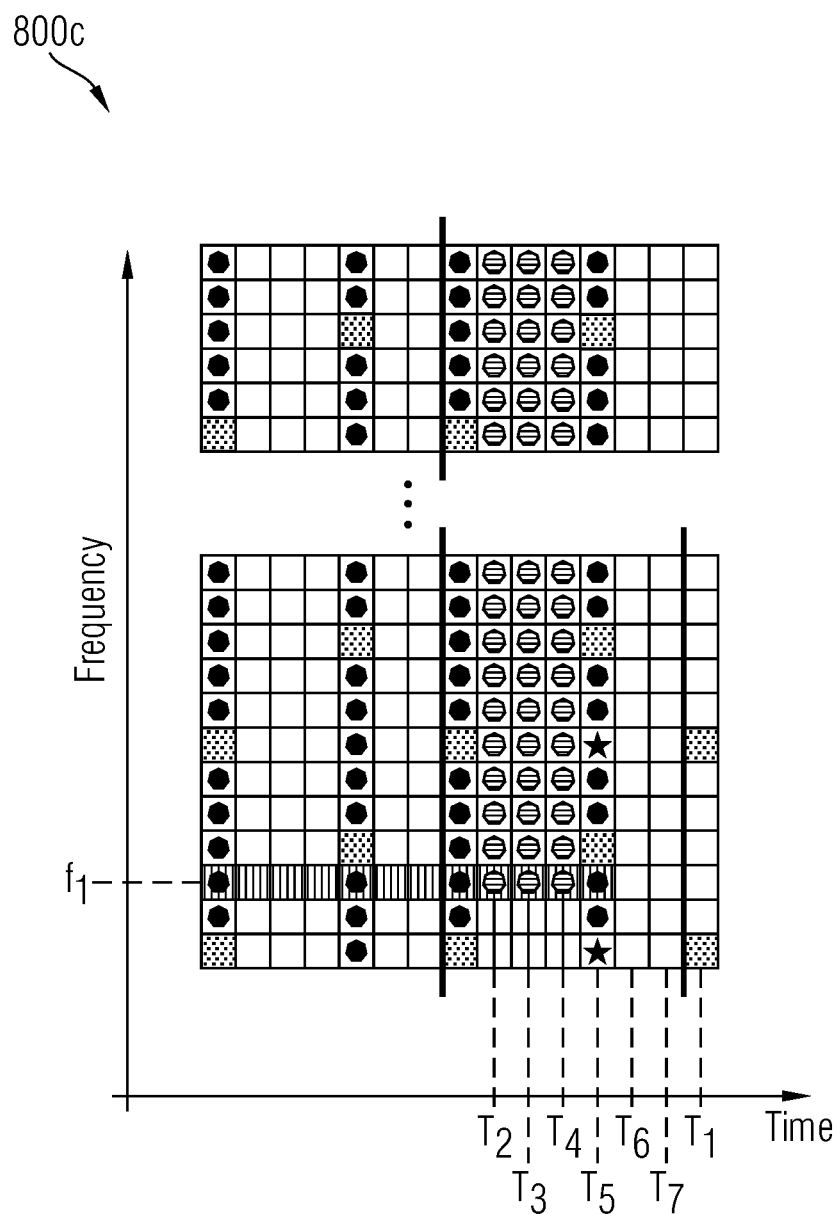
FIG. 8c schematically illustrates a third step of a 3×1D channel estimation method.

FIG. 8c schematically illustrates a time interpolation as a third stage of a 3×1D T-F-T channel estimation method. The third stage corresponds to the fifth method step S5 of method 700. The symbol-carrier matrix 800c corresponds to the symbol-carrier matrices 800a and 800b at a later time. At the time $T_1$, a time interpolation is performed and channel estimates of channel samples at times $T_2$, $T_3$ and $T_4$ for all sub-carrier frequencies are determined. For the sake of simplicity, FIG. 8c illustrates a time interpolation for a frequency $f_1$. In a similar way, at the time $T_5$, a time interpolation is performed and channel estimates of the channel samples at times $T_6$ and $T_7$ of the previous slot (not illustrated in FIG. 8c) are determined for all sub-carrier frequencies.

Generally, the 3×1D and the 2×1D approaches show a similar complexity if the frequency and time windows have the same length. However, the 3×1D approach has a minimum latency of one time slot (e.g., seven OFM symbols), while the latency of the 2×1D approach can be reduced to three to four symbols (see, e.g., symbol-carrier matrix of FIG. 5).

In the preceding paragraphs, the following 3-stage approaches have been described: 2D-T-F, 2D-F-T and 3×1D T-F-T. Other embodiments of 3-stage approaches are summarized in the following Table 4. Note that all of these 3-stage approaches benefit from the method step of making the symbol-carrier matrix more uniformly ordered and/or denser, before further interpolation techniques (see, e.g., 1D-time interpolation T and 1D-frequency interpolation F) are applied.

TABLE 4

| Stage 1 | Stage 2 | Stage 3 |
|---------|---------|---------|
| 2D | T | F |
| 2D | F | T |
| T | F | T |
| T | T | F |
| T | F | F |
| F | T | F |
| F | F | T |

Simulation results show the following beneficial effects of the 3×1D approach compared to the 2×1D approach: The 3×1D approach provides a more uniformly ordered symbol-carrier matrix. Further, the 3×1D approach leads to an improved noise averaging and minimizes the latency of its algorithm (one time slot, i.e. seven OFDM symbols). The 3×1D approach shows the same complexity as the 2×1D approach.

Figure 9:
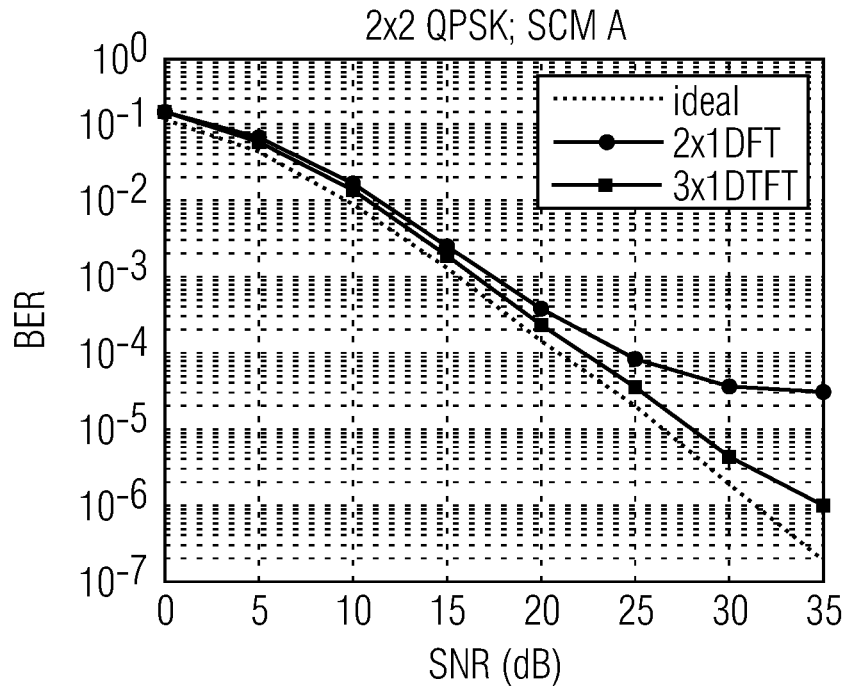
FIG. 9 schematically illustrates channel performances.

FIG. 9 illustrates channel performances, more precisely uncoded Bit Error Rate (BER) performances in static channels. The illustrated graphs relate to a 2×2 MIMO configuration employing a Quadrature Phase Shift Keying (QPSK) modulation technique. The BER is plotted against the SNR in units of dB, wherein a dotted line illustrates the ideal case. A solid line including circles illustrates the BER performance for the 2×1D F-T case, while a solid line including squares illustrates the BER performance for the 3×1D T-F-T case.

From FIG. 9 two beneficial effects of the 3-stage estimator compared to the 2-stage estimator become apparent. First, the BER floor at high SNR values is considerably reduced due to better interpolation properties. Second, noise averaging is improved leading to a gain of approximately 1 dB at medium SNR values. The improved noise averaging can be explained by the following difference between the 2-stage estimator and the 3-stage estimator.

In the 2×1D approach having a pilot spacing of six, some filter coefficients are located at the tails of the sinc function (see, e.g., equations (3) to (6)) and thus do not contribute to average the noise of the LS estimates used for the frequency interpolation. Further simulations have shown that the frequency window for the 2×1D approach could safely be reduced to about twelve coefficients with almost no loss in complexity. For the case of the 3×1D estimator, the filter window has the same number of samples/coefficients, but in contrast to the 2×1D approach, the duration of the window in frequency is shorter (half of the original one) caused by a denser pilot spacing (three subcarriers).

Figure 10:
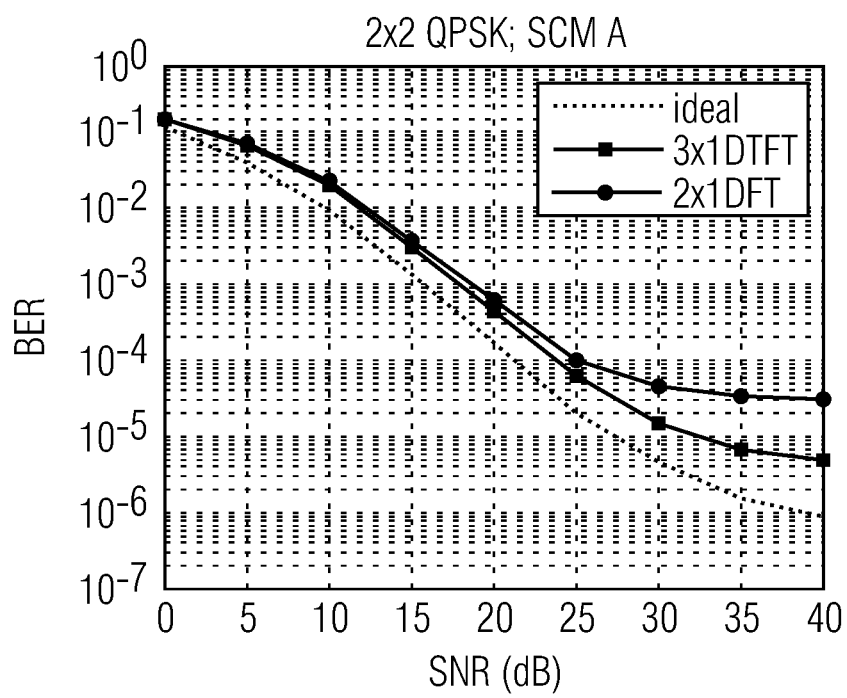
FIG. 10 schematically illustrates further channel performances.

FIG. 10 illustrates further channel performances, more precisely uncoded BER performances in time varying channels. Similar to FIG. 9, the illustrated graphs refer to a 2×2 MIMO configuration employing a QPSK modulation technique. The BER is plotted against the SNR in units of dB, wherein a dotted line illustrates the ideal case. A solid line including circles illustrates the BER performance for the 2×1D F-T case, while the solid line including squares illustrates the BER performance for the 3×1D T-F-T case.

The results of FIG. 10 are similar to those of FIG. 9, however, in a time varying channel, time interpolation tends to become more significant. It has been observed that even with a mobile speed of 100 km/h the 3×1D estimator outperforms the 2×1D estimator. Accordingly, signal processing employed for the 3-stage approach is considerably simplified due to the more uniformly ordered and/or denser symbol-carrier matrix or pilot grid generated by the first stage of the 3-stage estimator. For a spacing of three subcarriers, the pilot patterns for the first and the second reference symbols are identical. This implies that the frequency interpolation only needs a single set of coefficients and similar processing, while in the 2×1D approach two different sets are employed having different edge effects to account for.

Figure 11:
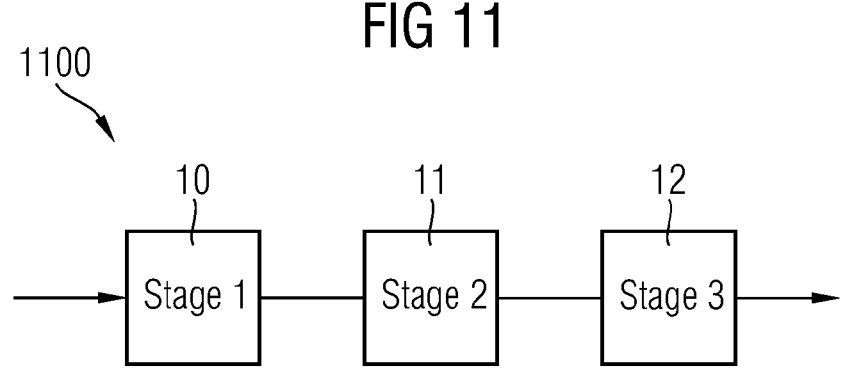
FIG. 11 schematically illustrates a channel estimator 1100.

FIG. 11 schematically illustrates one embodiment of a channel estimator 1100 for a multiple carrier radio transmission system, wherein the transmission system utilizes signals including a symbol-carrier matrix. The symbol-carrier matrix includes a pre-determined pattern of pilot symbols. The channel estimator 1100 includes a first channel estimation stage 10, a second channel estimation stage 11 and a third channel estimation stage 12. The operation mode of the channel estimator 1100 may be read in connection with the method 600. Here, the first channel estimation stage 10 performs the method step S2 of method 600. In addition, the second channel estimation stage 11 and the third channel estimation stage 12 perform the method steps S3 and S4, respectively.

Figure 12:
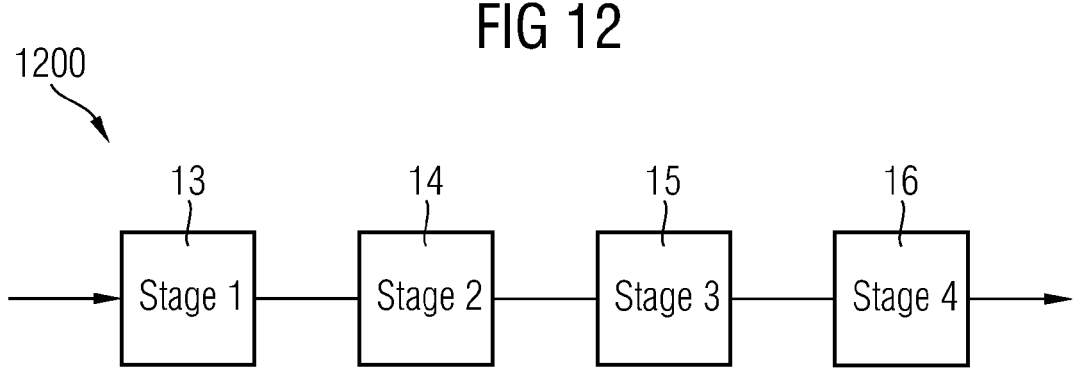
FIG. 12 schematically illustrates a further channel estimator 1200.

FIG. 12 schematically illustrates another embodiment of a channel estimator 1200 for a multiple carrier radio transmission system, wherein the transmission system utilizes signals including a symbol-carrier matrix. The symbol-carrier matrix includes a pre-determined pattern of pilot symbols. The channel estimator 1200 includes a first channel estimation stage 13, a second channel estimation stage 14, a third channel estimation stage 15 and a fourth channel estimation stage 16. The operation mode of the channel estimator 1200 may be read in connection with the method 700. Here, the first channel estimation stage 13 performs the method step S2 of method 700 and the second channel estimation stage 14 performs the method step S3 of the method 700. Further, the third channel estimation stage 15 and the fourth channel estimation stage 16 perform the method steps S4 and S5 of the method 700, respectively.

Figure 13:
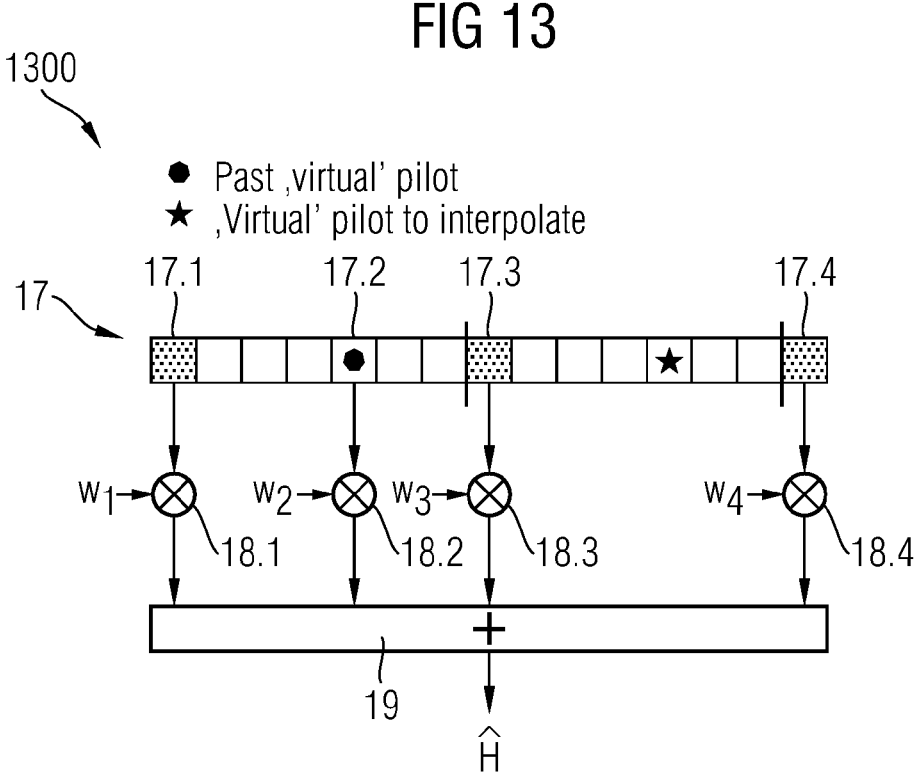
FIG. 13 schematically illustrates a linear FIR filter 1300.

FIG. 13 schematically illustrates one embodiment of a linear FIR filter 1300 configured to perform a time interpolation. The filter 1300 may be used as a first stage of a 3×1D T-F-T estimator. Moreover, referring back to FIG. 1, the filter 1300 may be included in the channel estimator 5. The filter 1300 is a 4-tap filter including a register 17, four multipliers 18.1 to 18.4 and an adding unit 19. Slots 17.1 to 17.4 of the register 17 are connected to the multipliers 18.1 to 18.4, respectively. Each of the multipliers 18.1 to 18.4 is connected to the adding unit 19.

In FIG. 13, a filtering operation is shown, for example, for one specific subcarrier frequency. The operation mode of the filter 1300 may be read in connection with the method step 800a. At time $T_1$, the channel coefficient for the virtual pilot in the fifth reference symbol of the previous slot is estimated (see, e.g., pilot indicated by a star). For this purpose, the channel estimates stored in the slots 17.1 to 17.4 are read out and multiplied by filter coefficients $w_1$ to $w_4$. In particular, each slot may include, for example, 32 bits for the storage of one complex valued channel estimate sample. The filter coefficients $w_1$ to $w_4$ are real-valued and may be calculated according to equation (8). For the sake of simplicity, a calculation unit employed for the calculation of the filter coefficients $w_1$ to $w_4$ is not explicitly illustrated. The weighted channel estimates are added employing the adding unit 19 which outputs the channel estimate $\hat{H}$ for the virtual pilot indicated by the star.

Note that FIG. 13 merely illustrates one filtering operation. To fully perform the method step 800a, similar filtering operations may need to be performed at time $T_1$ for further subcarrier frequencies. Moreover, to receive virtual pilots at other symbols (see, e.g., times $T_1'$, $T_1''$ and $T_5'$), further filtering operations may need to be performed at time $T_5$.

Figure 14:
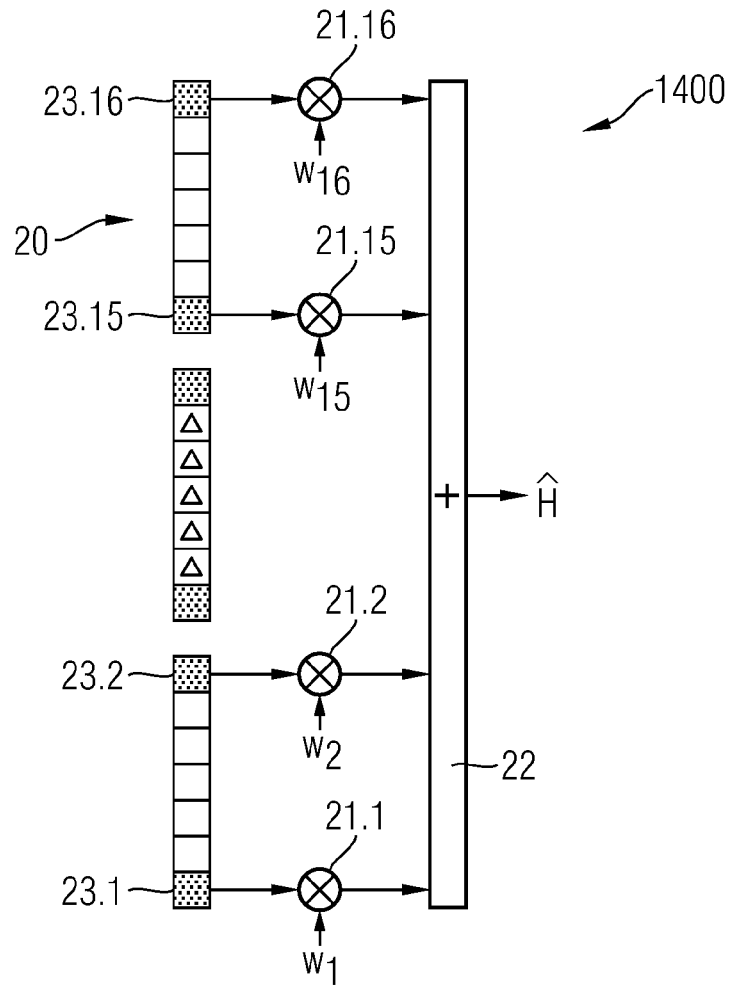
FIG. 14 schematically illustrates a further linear FIR filter 1400.

FIG. 14 schematically illustrates one embodiment of a further linear FIR filter 1400 configured to perform a frequency interpolation. The filter 1400 may be used as a second stage of a 3×1D T-F-T estimator. Moreover, referring back to FIG. 1, the filter 1400 may be included in the channel estimator 5. The filter 1400 is a 16-tap filter including a register 20, sixteen multipliers 21.1 to 21.16 and an adding unit 22. Slots 23.1 to 23.16 of the register 20 are connected to the multipliers 21.1 to 21.16, respectively. Each of the multipliers 21.1 to 21.16 is connected to the adding unit 22.

The operation mode of the filter 1400 may be read in connection with the method step 800b, wherein channel samples to be interpolated are indicated by triangles. FIG. 14, for example, merely illustrates five channel estimates to be interpolated using a corresponding time window centered on the respective subcarrier. Note that the channel estimates associated with the squares not containing a triangle will be interpolated as well, employing a different time window. In order to estimate the channel coefficient for such a sample, the channel estimates stored in the slots 23.1 to 23.16 are read out and multiplied by filter coefficients $w_1$ to $w_{16}$. The filter coefficients $w_1$ to $w_{16}$ may be calculated according to equation (7). Again, a calculation unit employed for the calculation of the filter coefficients $w_1$ to $w_{16}$ is not explicitly illustrated. The weighted channel estimates are added employing the adding unit 22 which outputs the channel estimate $\hat{H}$ for the corresponding channel sample.

To fully perform the method step 800b, the described filtering operation may need to be performed for each of the subcarriers indicated by a triangle. Each of these subcarriers may require a different set of filter coefficients $w_1$ to $w_{16}$. However, the pilots used for the interpolation (e.g., the pilots stored in slots 23.1 to 23.16) are the same for each of the subcarriers to be estimated.

Figure 15:
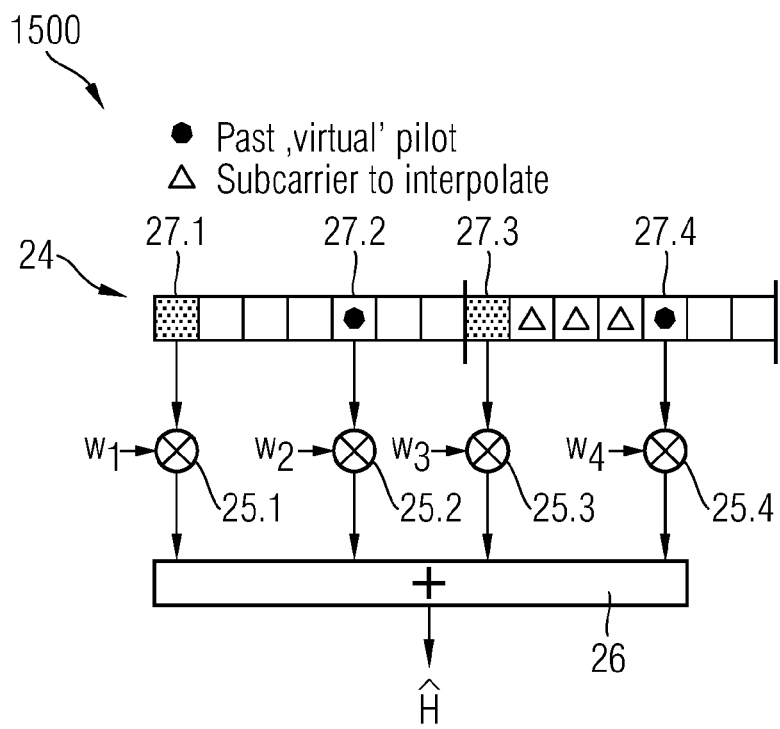
FIG. 15 schematically illustrates a further linear FIR filter 1500.

FIG. 15 schematically illustrates one embodiment of a further linear FIR filter 1500 configured to perform a time interpolation. The filter 1500 may be used as a third stage of a 3×1D T-F-T estimator. Moreover, referring back to FIG. 1, the filter 1500 may be included in the channel estimator 5. Similar to the filter 1300, the filter 1500 is a 4-tap filter. It includes a register 24, four multipliers 25.1 to 25.4 and an adding unit 26. Slots 27.1 to 27.4 of the register 24 are connected to the multipliers 25.1 to 25.4, respectively. Each of the multipliers 25.1 to 25.4 is connected to the adding unit 26.

In FIG. 15, a filtering operation is illustrated for one specific subcarrier frequency. The operation mode of the filter 1500 may be read in connection with the method step 800c. Here, the channel coefficients for the channel samples indicated by a triangle are estimated. For this purpose, the channel estimates stored in the slots 27.1 to 27.4 are read out and multiplied by filter coefficients $w_1$ to $w_4$. Similar to FIG. 13, the filter coefficients $w_1$ to $w_4$ are real-valued and may be calculated according to equation (8). Again, a calculation unit employed for calculating the filter coefficients $w_1$ to $w_4$ is not explicitly illustrated. The weighted channel estimates are added employing the adding unit 26 which outputs the channel estimate $\hat{H}$ for a channel sample indicated by a triangle.

FIG. 15 merely illustrates one filtering operation. To fully perform the method step 800c, similar filtering operations may need to be repeated for all channel samples indicated by a triangle, as well as for further subcarrier frequencies (see, e.g., method step 800c). The filter coefficients $w_1$ to $w_4$ may differ from the filter coefficients $w_1$ to $w_4$ shown in FIG. 13 due to different positions of the regarded slots and subcarriers.

In addition, symbol-carrier matrices may include symmetries, that is, the same set of filter coefficients may be reused for several groups of subcarriers/OFDM symbols. However, different sets of filter coefficients may still be employed to handle so-called edge effects. These edge effects may only affect a small percentage of subcarriers.

What is claimed is:

1. A method of channel estimation for a multiple carrier radio transmission system, comprising:
   receiving a signal comprising a symbol-carrier matrix, the symbol-carrier matrix comprising a pre-determined pattern of pilot symbols;
   determining first channel estimates at pilot symbol positions of the pilot symbols in the symbol-carrier matrix;
   determining second channel estimates at intermediate positions of the symbol-carrier matrix, wherein the intermediate positions are separated from the pilot symbol positions of the pilot symbols by positions associated with non-determined channel estimates; and
   determining third channel estimates at further positions of the symbol-carrier matrix,
   wherein determining the second channel estimates is performed by one or more of one-dimensional interpolation and two-dimensional interpolation from the first channel estimates, and
   wherein interpolation coefficients are determined for interpolations by 1D Wiener filtering in the time direction and the frequency direction, wherein the interpolation coefficients for the interpolation in the time direction are determined depending on a maximum Doppler bandwidth $f_{max}$ according to the following formulas:

$$w_t(l)^T = [w_{t,1}(l), \ldots, w_{t,N_t}(l)] = r_t(l)^T R_t^{-1}$$

wherein $$[r_t(l)]_i = si(2\pi f_{max} T_S(l-i))$$

wherein si denotes the sinc function, $T_s$ denotes the symbol duration and the index i indicates a time taken from a set T of times associated with the OFDM symbols used for interpolation, wherein the set T includes $N_t$ times and the index i runs from 1 to $N_t$, and the parameter i accounts for the fact that 1D Wiener filtering amounts to a sliding window operation along the time axis,
and $$[R_t]_{i,j} = si(2\pi f_{max} T_S(i-j)) + N_0/E_S \delta(i-j),$$

wherein the indices i and j run from 1 to $N_t$, respectively, $N_0$ denotes the variance of the additive white Gaussian noise, and $E_s$ denotes the energy per modulated symbol, and the interpolation coefficients for the interpolation in frequency direction are determined depending on a cyclic prefix length $\tau_{max}$ according to the following formulas:

$$w_f(n)^T = [w_{f,1}(n), \ldots, w_{f,N_f}(n)] = r_f(n)^T R_f^{-1}$$

wherein $$[r_f(n)]_i = si(2\pi \tau_{max} \Delta F(n-i)),$$

wherein the index i indicated a frequencies taken from a set F of frequencies associated with the pilots used for interpolation, the set F includes Nf frequencies and the index i runs from 1 to Nf, the parameter $\Delta F$ denotes the subcarrier spacing, and the parameter n accounts for the fact that 1D Wiener filtering amounts to a sliding window operation along the frequency axis,
and $$[R_f]_{i,j} = si(2\pi \tau_{max} \Delta F(i-j)) + N_0/E_S \delta(i-j).$$

2. The method of claim 1, wherein the intermediate positions have coordinates corresponding to one of symbol or carrier coordinates of the first channel estimates.

3. The method of claim 1, further comprising:
   determining the first channel estimates by a least square demodulation.

4. A method of channel estimation for a multiple carrier radio transmission system, comprising:
   receiving a signal comprising a symbol-carrier matrix, the symbol-carrier matrix comprising a pre-determined pattern of pilot symbols;
   determining first channel estimates at pilot symbol positions of the pilot symbols in the symbol-carrier matrix;
   determining second channel estimates at intermediate positions of the symbol-carrier matrix having coordinates corresponding to one of symbol or carrier coordinates of the first channel estimates, wherein the intermediate positions are separated from the positions of the pilot symbols by positions associated with non-determined channel estimates, wherein determining the second channel estimates occurs by one or more of one-dimensional interpolation and two-dimensional interpolation from the first channel estimates, and wherein interpolation coefficients for the interpolation are determined for interpolation in a time direction and/or a frequency direction, wherein the interpolation coefficients for the interpolation in the time direction are determined based on a maximum Doppler bandwidth and the interpolation coefficients for the interpolation in the frequency direction are determined based on a cyclic prefix length;

determining third channel estimates at further positions of the matrix having coordinates corresponding to one of symbol or carrier coordinates of the second channel estimates, wherein the third channel estimates are determined at least in part on the basis of the determined second channel estimates; and determining fourth channel estimates at further positions of the matrix having coordinates corresponding to one of symbol or carrier coordinates of the third channel estimates wherein the fourth channel estimates are determined at least in part on the basis of the determined third channel estimates;

wherein determining the second channel estimates is performed by one or more of one-dimensional interpolation and two-dimensional interpolation from the first channel estimates, and wherein interpolation coefficients are determined for interpolations by 1D Wiener filtering in the time direction and the frequency direction, wherein the interpolation coefficients for the interpolation in the time direction are determined depending on a maximum Doppler bandwidth $f_{max}$ according to the following formulas:

$$w_t(l)^T=[w_{t,1}(l),\ldots,w_{t,Nt}(l)]=r_t(l)^T R_t^{-1}$$

wherein $$[r_t(l)]_i = si(2\pi f_{max} T_s(l-i)$$

wherein si denotes the sinc function, Ts denotes the symbol duration and the index i indicates a time taken from a set T of times associated with the OFDM symbols used for interpolation wherein the set T includes $N_t$ times and the index i runs from 1 to $N_t$, and the parameter i accounts for the fact that 1D Wiener filtering amounts to a sliding window operation along the time axis, and $$[R_t]_{i,j} = si(2\pi f_{max} T_s(i-j)) + (N_0/E_S)\delta(i-j),$$

wherein the indices i and run from 1 to $N_t$ respectively $N_0$ denotes the variance of the additive white Gaussian noise and $E_s$ denotes the energy per modulated symbol and the interpolation coefficients for the interpolation in frequency direction are determined depending on a cyclic prefix length $\tau_{max}$ according to the following formulas:

$$w_f(n)^T=[w_{f,1}(n),\ldots,w_{f,Nf}(n)]=r_f(n)^T R_f^{-1}$$

wherein $$[r_f(n)]_i = si(2\pi\tau_{max}\Delta F(n-i)),$$

wherein the index i indicated a frequencies taken from a set F of frequencies associated with the pilots used for interpolation, the set F includes Nf frequencies and the index i runs from 1 to Nf, the parameter $\Delta F$ denotes the subcarrier spacing, and the parameter n accounts for the fact that 1D Wiener filtering amounts to a sliding window operation along the frequency axis, and $$[R_f]_{i,j} = si(2\pi\tau_{max}\Delta F(i-j)) + (N_0/E_S)\delta(i-j).$$

5. The method of claim 4, further comprising:
determining the first channel estimates by a least squares demodulation.

6. A channel estimator for a multiple carrier radio transmission system, the system utilizing signals comprising a symbol-carrier matrix comprising a pre-determined pattern of pilot symbols, the channel estimator comprising:

a first channel estimation stage configured to determine first channel estimates at pilot symbol positions of the pilot symbols in the symbol-carrier matrix;

a second channel estimation stage configured to determine second channel estimates at intermediate positions of the symbol-carrier matrix, wherein the intermediate positions are separated from the pilot symbol positions of the pilot symbols by positions associated with non-determined channel estimates, wherein the second channel estimation stage comprises one or more of a one-dimensional channel estimator and a two-dimensional channel estimator, and wherein the second channel estimation stage is configured to perform interpolation using interpolation coefficients that are determined for interpolation in a time direction and/or a frequency direction, wherein the interpolation coefficients for the interpolation in the time direction are determined based on a maximum Doppler bandwidth and the interpolation coefficients for the interpolation in the frequency direction are determined based on a cyclic prefix length; and a third channel estimation stage configured to determine third channel estimates at further positions of the symbol-carrier matrix wherein the third channel estimates are determined at least in part on the basis of the determined second channel estimates;

wherein the second channel estimation stage is performed by one or more of one-dimensional interpolation and two-dimensional interpolation from the first channel estimates, and wherein interpolation coefficients are determined for interpolations by 1D Wiener filtering in the time direction and the frequency direction, wherein the interpolation coefficients for the interpolation in the time direction are determined depending on a maximum Doppler bandwidth $f_{max}$ according to the following formulas:

$$w_t(l)^T=[w_{t,1}(l),\ldots,w_{t,Nt}(l)]=r_t(l)^T R_t^{-1}$$

wherein $$[r_t(l)]_i = si(2\pi f_{max} T_s(l-i))$$

wherein si denotes the sinc function, Ts denotes the symbol duration and the index i indicates a time taken from a set T of times associated with the OFDM symbols used for interpolation wherein the set T includes $N_t$ times and the index i runs from 1 to $N_t$, and the parameter i accounts for the fact that 1D Wiener filtering amounts to a sliding window operation along the time axis, and $$[R_t]_{i,j} = si(2\pi f_{max} T_s(i-j)) + (N_0/E_S)\delta(i-j),$$

wherein the indices i and run from 1 to $N_t$ respectively $N_0$ denotes the variance of the additive white Gaussian noise and $E_s$ denotes the energy per modulated symbol and the interpolation coefficients for the interpolation in frequency direction are determined depending on a cyclic prefix length $\tau_{max}$ according to the following formulas:

$$w_f(n)^T = [w_{f,1}(n), \ldots, w_{f,Nf}(n)] = r_f(n)^T R_f^{-1}$$

wherein $$[r_f(n)]_i = si(2\pi\tau_{max}\Delta F(n-i)),$$

wherein the index i indicated a frequencies taken from a set F of frequencies associated with the pilots used for interpolation, the set F includes Nf frequencies and the index i runs from 1 to Nf, the parameter $\Delta F$ denotes the sub-carrier spacing, and the parameter n accounts for the fact that 1D Wiener filtering amounts to a sliding window operation along the frequency axis, and $$[R_f]_{i,j} = si(2\pi\tau_{max}\Delta F(i-j)) + (N_0/E_S)\delta(i-j).$$

7. The channel estimator of claim 6, wherein the third channel estimation stage comprises a Wiener interpolator.

8. The channel estimator of claim 6, wherein the first channel estimation stage comprises a least squares demodulator.

9. The channel estimator of claim 6, wherein the multiple carrier radio transmission system comprises an OFDM system.

10. A channel estimator for a multiple carrier radio transmission system, the system utilizing signals comprising a symbol-carrier matrix, the symbol-carrier matrix comprising a pre-determined pattern of pilot symbols, the channel estimator comprising
 a first channel estimation stage configured to determine first channel estimates at pilot symbol positions of the pilot symbols in the symbol-carrier matrix;
 a second channel estimation stage configured to determine second channel estimates at further positions of the matrix having coordinates corresponding to one of symbol or carrier coordinates of the first channel estimates, wherein the second channel estimation stage comprises one or more of a one-dimensional channel estimator and a two-dimensional channel estimator, and wherein the second channel estimation stage is configured to perform interpolation using interpolation coefficients that are determined for interpolation in a time direction and/or a frequency direction, wherein the interpolation coefficients for the interpolation in the time direction are determined based on a maximum Doppler bandwidth and the interpolation coefficients for the interpolation in the frequency direction are determined based on a cyclic prefix length;
 a third channel estimation stage configured to determine third channel estimates at further positions of the matrix having coordinates corresponding to one of symbol or carrier coordinates of the second channel estimates wherein the third channel estimates are determined at least in part on the basis of the determined second channel estimates; and
 a fourth channel estimation stage configured to determine fourth channel estimates at further positions of the matrix having coordinates corresponding to one of symbol or carrier coordinates of the third channel estimates wherein the fourth channel estimates are determined at least in part on the basis of the determined third channel estimates;
 wherein the second channel estimation stage is performed by one or more of one-dimensional interpolation and two-dimensional interpolation from the first channel estimates, and wherein interpolation coefficients are determined for interpolations by 1D Wiener filtering in the time direction and the frequency direction, wherein the interpolation coefficients for the interpolation in the time direction are determined depending on a maximum Doppler bandwidth $f_{max}$ according to the following formulas:

$$w_t(l)^T = [w_{t,1}(l), \ldots, w_{t,Nt}(l)] = r_t(l)^T R_t^{-1}$$

wherein $$[r_t(l)]_i = si(2\pi f_{max} T_s(l-i))$$

wherein si denotes the sinc function, Ts denotes the symbol duration and the index i indicates a time taken from a set T of times associated with the OFDM symbols used for interpolation wherein the set T includes $N_t$ times and the index i runs from 1 to $N_t$, and the parameter i accounts for the fact that 1D Wiener filtering amounts to a sliding window operation along the time axis, and $$[R_t]_{i,j} = si(2\pi f_{max} T_s(i-j)) + (N_0/E_S)\delta(i-j),$$

wherein the indices i and run from 1 to N respectively $N_O$ denotes the variance of the additive white Gaussian noise and $E_s$ denotes the energy per modulated symbol and the interpolation coefficients for the interpolation in frequency direction are determined depending on a cyclic prefix length $\tau_{max}$ according to the following formulas:

$$w_f(n)^T = [w_{f,1}(n), \ldots, w_{f,Nf}(n)] = r_f(n)^T R_f^{-1}$$

wherein $$[r_f(n)]_i = si(2\pi\tau_{max}\Delta F(n-i)),$$

wherein the index i indicated a frequencies taken from a set F of frequencies associated with the pilots used for interpolation, the set F includes Nf frequencies and the index i runs from 1 to Nf, the parameter $\Delta F$ denotes the sub-carrier spacing, and the parameter n accounts for the fact that 1D Wiener filtering amounts to a sliding window operation along the frequency axis, and $$[R_f]_{i,j} = si(2\pi\tau_{max}\Delta F(i-j)) + (N_0/E_S)\delta(i-j).$$

11. The channel estimator of claim 10, wherein the third channel estimation stage comprises a Wiener interpolator.

12. The channel estimator of claim 10, wherein the first channel estimation stage comprises a least squares demodulator.

13. The channel estimator of claim 10, wherein the multiple carrier radio transmission system comprises an OFDM system.

14. A receiver for a multiple carrier radio transmission system, the system utilizing signals comprising a symbol-carrier matrix, the symbol-carrier matrix comprising a pre-determined pattern of pilot symbols, the receiver comprising
 a first channel estimation stage configured to determine first channel estimates at pilot symbol positions of the pilot symbols in the symbol-carrier matrix;
 a second channel estimation stage configured to determine second channel estimates at intermediate positions of the symbol-carrier matrix, wherein the intermediate positions are separated from the pilot symbol positions of the pilot symbols by positions associated with non-determined channel estimates, wherein the second channel estimation stage comprises one or more of a one-dimensional channel estimator and a two-dimensional channel estimator, and wherein the second channel estimation stage is configured to perform interpolation using interpolation coefficients that are determined for interpolation in a time direction and/or a frequency direction, wherein the interpolation coefficients for the interpolation in the time direction are determined based on a maximum Doppler bandwidth and the interpolation coefficients for the interpolation in the frequency direction are determined based on a cyclic prefix length; and a third channel estimation stage configured to determine third channel estimates at further positions of the symbol-carrier matrix wherein the third channel estimates are determined at least in part on the basis of the determined second channel estimates;

wherein the second channel estimation stage is performed by one or more of one-dimensional interpolation and two-dimensional interpolation from the first channel estimates, and wherein interpolation coefficients are determined for interpolations by 1D Wiener filtering in the time direction and the frequency direction, wherein the interpolation coefficients for the interpolation in the time direction are determined depending on a maximum Doppler bandwidth $f_{max}$ according to the following formulas:

$$w_t(l)^T = [w_{t,1}(l), \ldots, w_{t,N_t}(l)] = r_t(l)^T R_t^{-1}$$

wherein $$[r_t(l)]_i = si(2\pi f_{max} T_s (l-i)))$$

wherein si denotes the sinc function, Ts denotes the symbol duration and the index i indicates a time taken from a set T of times associated with the OFDM symbols used for interpolation wherein the set T includes $N_t$ times and the index i runs from 1 to $N_t$, and the parameter i accounts for the fact that 1D Wiener filtering amounts to a sliding window operation along the time axis, and $$[R_t]_{i,j} = si(2\pi f_{max} T_s (i-j)) + (N_0/E_S)\delta(i-j),$$

wherein the indices i and run from 1 to N respectively, $N_0$ denotes the variance of the additive white Gaussian noise and $E_s$ denotes the energy per modulated symbol and the interpolation coefficients for the interpolation in frequency direction are determined depending on a cyclic prefix length $\tau_{max}$ according to the following formulas:

$$w_f(n)^T = [w_{f,1}(n), \ldots, w_{f,N_f}(n)] = r_f(n)^T R_f^{-1}$$

wherein $$[r_f(n)]_i = si(2\pi \tau_{max} \Delta F(n-i)),$$

wherein the index i indicated a frequencies taken from a set F of frequencies associated with the pilots used for interpolation, the set F includes Nf frequencies and the index i runs from 1 to Nf, the parameter ΔF denotes the subcarrier spacing, and the parameter n accounts for the fact that 1D Wiener filtering amounts to a sliding window operation along the frequency axis, and $$[R_f]_{i,j} = si(2\pi \tau_{max} \Delta F(i-j)) + (N_0/E_S)\delta(i-j).$$

15. The receiver of claim 14, wherein the third channel estimation stage comprises a Wiener interpolator.

16. The receiver of claim 14, wherein the first channel estimation stage comprises a least squares demodulator.

17. The receiver of claim 14, wherein the multiple carrier radio transmission system comprises an OFDM system.

18. A channel estimator for a multiple carrier radio transmission system, said system utilizing signals comprising a symbol-carrier matrix comprising a pre-determined pattern of pilot symbols, the channel estimator comprising:

a first channel estimation stage configured to determine first channel estimates by time interpolation, the first channel estimation stage comprising a first linear finite impulse response filter, the first linear finite impulse response filter comprising a register, a plurality of multipliers, and an adder, wherein each one of the multipliers comprises a first input, a second input and an output, the register comprises a plurality of slots configured to store channel estimates of different carrier positions of the symbol-carrier matrix, each one of the plurality of slots being coupled with the first input of one of the multipliers, the second input of each one of the multipliers being configured to receive one of a plurality of filter coefficients, and the output of each one of the multipliers being coupled to the adder; and a second channel estimation stage configured to determine second channel estimates by frequency interpolation, the second channel estimation stage comprising a second linear finite impulse response filter, the second linear finite impulse response filter comprising a register, a plurality of multipliers, and an adder, wherein each one of the multipliers comprises a first input, a second input and an output, the register comprises a plurality of slots configured to store channel estimates of different symbol positions of the symbol-carrier matrix, each one of the plurality of slots being coupled with the first input of one of the multipliers, the second input of each one of the multipliers being configured to receive one of a plurality of filter coefficients, and the output of each one of the multipliers being coupled to the adder.

* * * * *